Sept. 6, 1938.　　　　F. M. KLEMA　　　　2,129,138
SPEED CHANGE MECHANISM
Filed July 27, 1936　　　2 Sheets-Sheet 1

INVENTOR
Frank M. Klema
BY Fred A. Parsons
ATTORNEY

Sept. 6, 1938.    F. M. KLEMA    2,129,138
SPEED CHANGE MECHANISM
Filed July 27, 1936    2 Sheets-Sheet 2
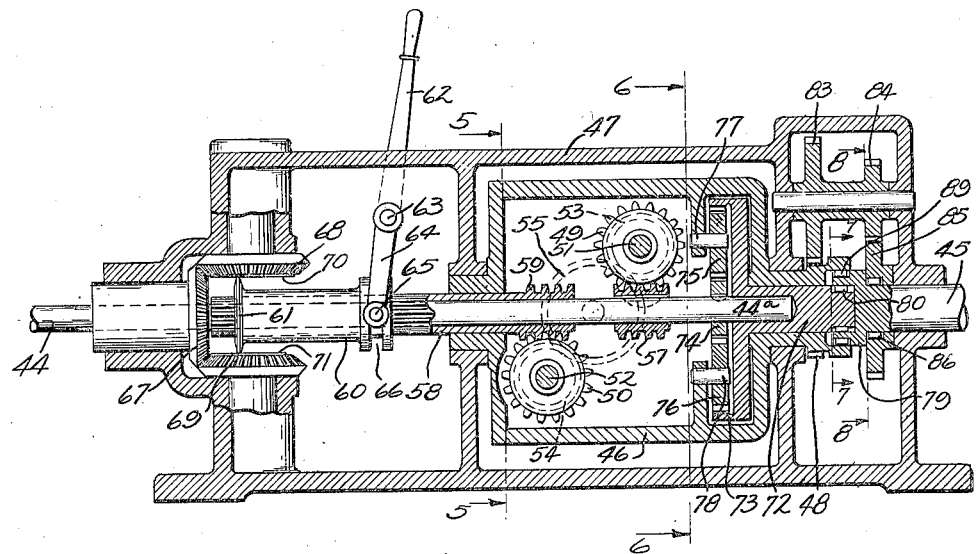
INVENTOR
Frank M. Klema
BY Fred A. Parsons
ATTORNEY Patented Sept. 6, 1938

2,129,138

UNITED STATES PATENT OFFICE 2,129,138

SPEED CHANGE MECHANISM

Frank M. Klema, Racine, Wis.

Application July 27, 1936, Serial No. 92,722

4 Claims. (Cl. 74—285)

This invention relates to speed change mechanism and more particularly to a mechanical rate changer in which any speed intermediate the maximum and minimum available may be obtained by suitable adjustment of a controller.

A purpose of the invention is to provide an improved speed change device which may be driven from a constant speed source for effecting a wide range of speeds and which is adjustable to effect any intermediate speed.

A further purpose is to provide an improved speed changer having a wide range of speeds and adjustable to any speed within its range by suitably positioning a single operating or control lever.

A further purpose is to provide an improved speed changer with automatic back gears in which the drive connection excludes the back gears during operation effecting a series of speeds of the output end, and the back gears are automatically brought into action at a suitable time to effect a second series forming a continuation of the first speed series.

A further purpose is generally to simplify and improve the construction and operation of change speed devices of the type and for one or more of the purposes previously mentioned.

The same reference characters have been used throughout to indicate the same parts, and in the drawings:

Figure 4 is a vertical section of a modified form of the speed change device shown in Fig. 1, and including automatically operative back gears.

Figure 5 is a partial vertical section taken along line 5—5 of Fig. 4.

Figure 6 is a vertical section taken along line 6—6 of Fig. 4.

Figures 7 and 8 are partial vertical sections respectively taken along lines 7—7 and 8—8 of Fig. 4.

Figure 1:
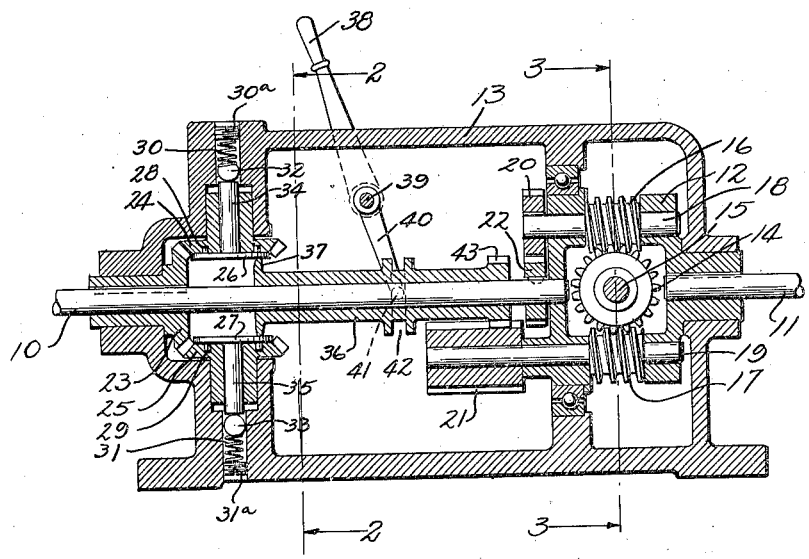
Figure 1 is a vertical section through a speed change device incorporating the invention in one of its preferred forms, taken approximately along line 1—1 of Fig. 2.
Figure 2:
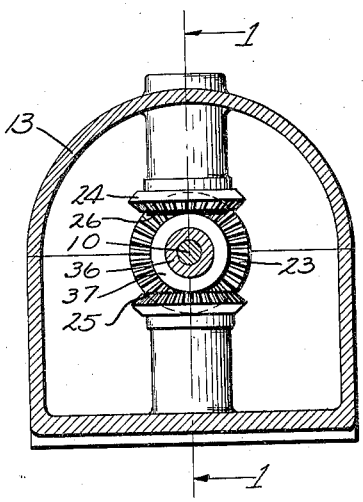
Figure 2 is a transverse section of the same device taken approximately along line 2—2 of Fig. 1.
Figure 3:
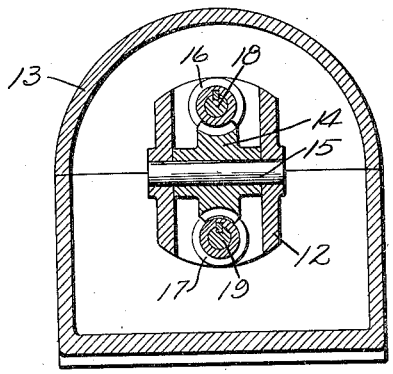
Figure 3 is a transverse section taken approximately along line 3—3 of Fig. 1.

The device shown in Fig. 1 includes a driving shaft 10 and a co-axial shaft 11 driven therefrom. By the means of mechanism later described shaft 11 may be driven at either minimum or maximum speed or at any intermediate speed. With the mechanism proportioned as here shown the minimum speed of shaft 11 is zero and the maximum speed is approximately the same as the speed of shaft 10. The transmission connecting shafts 10 and 11 is as follows:

A cage or rotor 12 is journaled in suitable bearings in a housing 13 for rotation co-axially with shafts 10 and 11. A worm wheel 14 is rotatable on a stud 15 fixed in the cage. Engaging worm wheel 14 on the opposite sides thereof are worms 16, 17 respectively fixed on shafts 18, 19, upon which are also fixed the gears 20, 21, the several parts all being bodily rotatable with cage 12, as well as on their respective axes.

Worm 16 is connected to be driven from shaft 10 through a gear 22 fixed on the extended end of the shaft and engaging the gear 20.

Worm 17 is connected to be driven from shaft 10 through the following mechanism: A bevel gear 23, fixed on shaft 10, drives co-axial gears 24, 25 in opposite directions. The bevel gears 24, 25 are respectively provided with friction disks 26, 27, the disks being positively driven from the associated bevel gear, there being driving lugs such as 28, 29 fixed with the disks and engaging suitable gear recesses, the disks being each axially adjustable relative to the associated gear and continuously resiliently urged toward one another by springs such as 30, 31 operating through suitable friction reducing elements such as balls 32, 33 thrusting against the shanks 34, 35 of the respective friction disks. The spring friction may be adjusted by screws 30a, 31a. Carried on shaft 10, but rotatable relative thereto, is a sleeve 36 upon which is fixed a friction ring or annulus 37 positioned between the friction disks 26, 27, to be peripherally engaged thereby, the respective friction disks being thrust against opposite peripheral points of the annulus by springs 30. The sleeve 36 is axially adjustable, as for instance by a hand lever 38 fixed on a shaft 39 carrying a lever 40 having a portion 41 engaging an annular groove 42 on the sleeve. A gear 43 fixed on sleeve 36 engages the gear 21 to drive worm 17 in any axial position of the sleeve.

The described construction is such that the gear 22 simultaneously urges rotation of gear 20 on its own axis and a bodily rotation thereof together with cage 12 on the axis of cage 12, the axial rotation of gear 20 being opposite to the rotation of drive shaft 10, and the axial rotation of cage 12 being in the same direction as drive shaft 10.

When annulus 37 is shifted to central position Fig. 1, whereby both the annulus and the gear 43 are prevented from rotating, the rotation of cage 12 as described causes a rotation of gear 21 on its own axis in a direction opposite to the rotation of gear 20. The result is simultaneously to urge each of the worms 16, 17, respectively connected to gears 20, 21, in opposite direction, whereby each urges rotation of worm wheel 14 on its own axis in the same direction. The ratio of the trains respectively connecting gears 22, 43 to the worm wheel 14 are such that in this instance, when annulus 37 and gear 43 are stationary, the cage 12 and output shaft 11 will rotate at one half the speed of drive shaft 10, and in the same direction.

As the annulus 37 is shifted from central position to the left in Fig. 1, whereby to drive the annulus at increasing speed in the same direction as shaft 10, the annulus urges a rotation of gear 21 and worm 17 on their own axis in a direction opposite to that urged by the previously described bodily rotation of gear 21 and worm 17 with the cage 12. The speed of axial rotation of worm 17 then is determined by the difference between the two speeds respectively urged by its bodily and axial rotation, and at the point in the left hand adjustment of the annulus 37 where the speed of the annulus equals the speed of drive shaft 10, the worm 17 ceases to revolve on its own axis because the two speeds urged are equal and opposite. Worm wheel 14, worm 16 and gear 20 are then prevented from rotation on their own axes and the result is a unitary bodily rotation of all the parts to drive output shaft 11 at the same speed and in the same direction as drive shaft 10.

As the annulus 37 is shifted from central position to the right in Fig. 1, whereby to drive the annulus at increasing speed in the opposite direction to shaft 10, the annulus urges a rotation of gear 21 and worm 17 on their own axis in a direction the same as shaft 10, and opposite to worm 16, and at the point of extreme right hand adjustment of the annulus the worms are revolving oppositely at the same speed as shaft 10, and cage 12 and output shaft 11 are stationary.

In each of the above described adjustments of the annulus 37 (except the extreme right position when the output shaft is stationary) and in all intermediate adjustments, the output shaft 11 is rotating in the same direction as drive shaft 10, and at a speed determined by the axial position of the annulus. According to the adjustment the output shaft may have any speed from zero to the same speed as the drive shaft. It will be understood however that with suitably modified trains the output shaft 11 may have a maximum speed either higher or lower than drive shaft 10, and its range may be extended to pass through the zero speed to include reverse rotation.

In the modified form of the device as shown in Fig. 4 a driving shaft 44 drives an output shaft 45 through mechanism which in part is similar in operation to that described for the device in Fig. 1, but which includes automatic back gear mechanism as will be described.

A cage or rotor 46 is journaled in suitable bearings in a housing 47, the one end of the rotor being extended to carry an output gear 48 fixed thereon. A plurality of worm wheels 49, 50 are each journaled in the cage 46, respectively on studs 51, 52. Fixed for rotation with the respective worm wheels are spur gears 53, 54, which are inter-connected by an idler gear 55, the extended shank 56 of which is journaled in a suitable bearing in cage 46. By the means of this construction the worm wheels 49, 50 are restrained to rotate in the same direction and at the same speeds, thereby corresponding in effect, to the single worm wheel 14 of the device of Fig. 1. The shaft 44 is extended, and fixed thereon is a worm 57 engaging the worm wheel 49. Co-axial with the shaft 44 is a sleeve 58, rotatable relative to the shaft. At the one end the sleeve 58 carries a worm 59 meshing with the worm wheel 50. At the other end the sleeve 58 has slidably splined thereon an outer sleeve 60 upon which is fixed a friction annulus 61, which may be axially shifted by the means of a hand lever 62 fixed on a shaft 63 upon which is also a lever 64 having a portion 65 engaging an annular groove 66 on the sleeve 60. For driving the friction annulus 61 there are provided the bevel gears 67, 68, 69 journaled in the housing 47, the gears 67 being keyed to the shaft 44 and oppositely driving the co-axial gears 68, 69. Gears 68, 69 are provided with axially adjustable spring pressed friction disks 70, 71, the details of the disks and spring pressure means not being shown in Fig. 4 since they are exactly similar to the corresponding structure shown in Fig. 1, which has been previously described.

It will be obvious that the structure of Fig. 4 thus far described, if the parts are suitably proportioned, will drive the cage 46 and gear 48 in the same direction as shaft 44 at any speed from zero to maximum, depending upon the axial adjustment of the friction annulus 61, in a manner exactly similar to that in which the cage 12 and shaft 11 are driven at various speeds by the structure shown in Fig. 1.

The extended journaled end of cage 46, at the right in Fig. 4, is provided with a suitable bore co-axial with shaft 10 in which is journaled an independently rotatable shaft 72, which in turn is provided with a suitable co-axial bore in which is independently rotatably supported the extended end 44a of the shaft 44. Fixed on the shaft 72 is an internal gear 73, and fixed on the extended end of shaft 44 is a gear 74. Gear 74 is connected to drive internal gear 73 through oppositely disposed idler gears 75, 76, each simultaneously meshing with gears 74 and gear 73 and respectively rotatable on the studs 77, 78 which are fixed for bodily rotation with the cage 46.

The described connection from the shaft 44 to the shaft 72, through the gears 74 and 73, is such that when cage 46 is stationary, or rotating at relatively slow speeds, the internal gear 73 and shaft 72 rotates in a direction opposite to shaft 44 and gear 48. When cage 46 is rotating at maximum speed or at relatively high speeds the internal gear 73 and shaft 72 rotate in the same direction as shaft 44 and gear 48.

The output shaft 45 has fixed thereon a member 79 forming the outer annular member of an overrunning clutch device generally indicated by the numeral 80, Fig. 7, which may be of any suitable well known form adapted to drive the shaft 45 from the shaft 72 in the direction of rotation of shaft 72 corresponding to the direction of shaft 44, but not when shaft 72 is rotating in the opposite direction. The overrunning clutch may take the form of rollers such as 81, 82 seated on suitable cam surfaces formed on shaft 72, as shown in Fig. 7, and spring pressed in a direction to positively drive the member 79 and shaft 45, when shaft 72 is driven in the direction of the arrow of Fig. 7.

The gear 48 is connected to drive the shaft 45 through back gears which include the gear 48, a gear 83 meshed therewith, a gear 84 fixed for rotation with gear 83, and a gear 85 co-axial with shaft 45 and meshing with gear 84, the connection between the gear 85 and shaft 45 being effected by an overrunning clutch device of any suitable form, adapted to drive the shaft 45 from gear 85, but only in the event that shaft 45 is not being actuated from shaft 72 at a rotational speed higher than that of the gear 85. A suitable clutch for this purpose is generally indicated by the numeral 86, Fig. 8, and includes spring pressed rollers 87, 88 seated on suitable cam surfaces formed on the shaft 45 and adapted to drive shaft 45 from the gear 85 when the gear is rotating in the direction indicated by the arrow. But if the shaft 72 is running in the direction of the arrow, Fig. 7, at a speed higher than the speed of gear 85 the clutch 86 will release to permit shaft 45 to be driven from shaft 72.

The ratio of the various gears is preferably such that the highest speed of gear 85 is materially lower than the highest forward speed of shaft 82, and in such case the highest speeds of output shaft 45 are through the internal gear 73 and shaft 72, while the low speeds are through the back gears, and at the same intermediate point, both in the upward and downward adjustment of speeds as controlled by lever 62 and annulus 61 the clutches 82, 86 will operate automatically to change the driving connection to effect the result just mentioned.

Under certain conditions, as for instance when shaft 45 is connected to the driving wheels of an automobile which is traveling down hill, shaft 45 might tend to overrun its driving transmission, since neither of the clutches 80 or 86 would operate to restrain such effect. To avoid such overrun an additional clutch is provided, as generally indicated by the numeral 89, Fig. 8.

Clutch 89 may be of any suitable form, but in this case is similar in construction to the clutches 80, 86, and includes spring pressed rollers such as 90, 91, each having cam seats formed on the exterior of the member 79 and adapted to prevent shaft 45 and member 79 from rotating faster in the forward direction than the rotational speed of cage 46 and gear 48, the external element of the clutch being formed by the extended hub of gear 48, as shown in Fig. 4.

It will be understood that the structure shown may be modified in various particulars to effect equivalent structures, and that each such modification is contemplated as within the scope of the invention if within the scope of the claims.

What is claimed is:

1. In a rate change mechanism the combination of a driving shaft, a driven shaft, a rotatable cage connected for rotation of said driven shaft, and transmission mechanism connecting said driving shaft for rotation of said cage including a worm wheel rotatably mounted on said cage, a plurality of rotatable worms each engaging said wheel, a train connecting said driving shaft through one of said worms for continuously urging rotation of said wheel, a rate changer driven from said drive shaft, and another train connecting said rate changer and wheel through the other of said worms.

2. In a rate change mechanism the combination of a driving shaft, a driven shaft, a rotatable cage connected for rotation of said driven shaft and transmission mechanism connecting said driving shaft for rotation of said cage including a worm wheel rotatably mounted on said cage for rotation on an axis transverse to the cage axis, a plurality of worms each rotatably carried by said cage and each engaging said wheel, a train connecting said driving shaft through one of said worms for continuously urging rotation of said wheel, a rate changer including an adjustable friction device, said rate changer being driven from said drive shaft, and another train connecting said rate changer and wheel through the other of said worms.

3. In a rate change mechanism the combination of a driving shaft, a driven shaft co-axial therewith, a cage rotatable co-axial with said drive shaft and connected to drive said driven shaft, a worm wheel rotatably mounted in said cage for rotation on an axis intersecting the axis of said driving shaft and at right angles thereto, a plurality of worms each rotatably mounted on said cage, said worms each engaging said worm wheel respectively at opposite peripheral points thereof, the axes of said worms being parallel with the axis of said drive shaft and spaced therefrom, a train connecting said driving shaft with one of said worms including a pair of meshed gears, co-axial friction disks spaced apart along their axes and connected with said drive shaft to be oppositely driven, a friction annulus interposed to be simultaneously engaged by said friction disks at opposite peripheral points on the annulus, a train including another pair of meshed gears connecting said annulus with the other of said worms, and means for the axial adjustment of said annulus, one of the gears of each of said meshed pairs being supported for bodily rotation with said cage.

4. In a rate change mechanism the combination of a driving shaft, a driven shaft co-axial therewith, a cage rotatable co-axial with said drive shaft and connected to drive said driven shaft, a worm wheel rotatably mounted in said cage for rotation on an axis intersecting the axis of said driving shaft and at right angles thereto, a plurality of worms each rotatably mounted on said cage, said worms each being journaled in said cage and engaging said worm wheel respectively at opposite peripheral points thereof, the axes of said worms being parallel with the axis of said drive shaft and spaced therefrom, a train connecting said driving shaft with one of said worms including meshed gears, and a train connecting said driving shaft with the other of said worms, the last mentioned train including an adjustable rate change device and another pair of meshed gears, one of the gears of each of said pairs being bodily rotatable with said cage.

FRANK M. KLEMA.